EXAMINER.

BEST AVAILABLE COPY

2 Sheets--Sheet 1.

(154.)

J. R. HAWKINS.

Base Burning Stove.

No. 4,705.

Fig. 1.

Reissued Jan. 9, 1872.

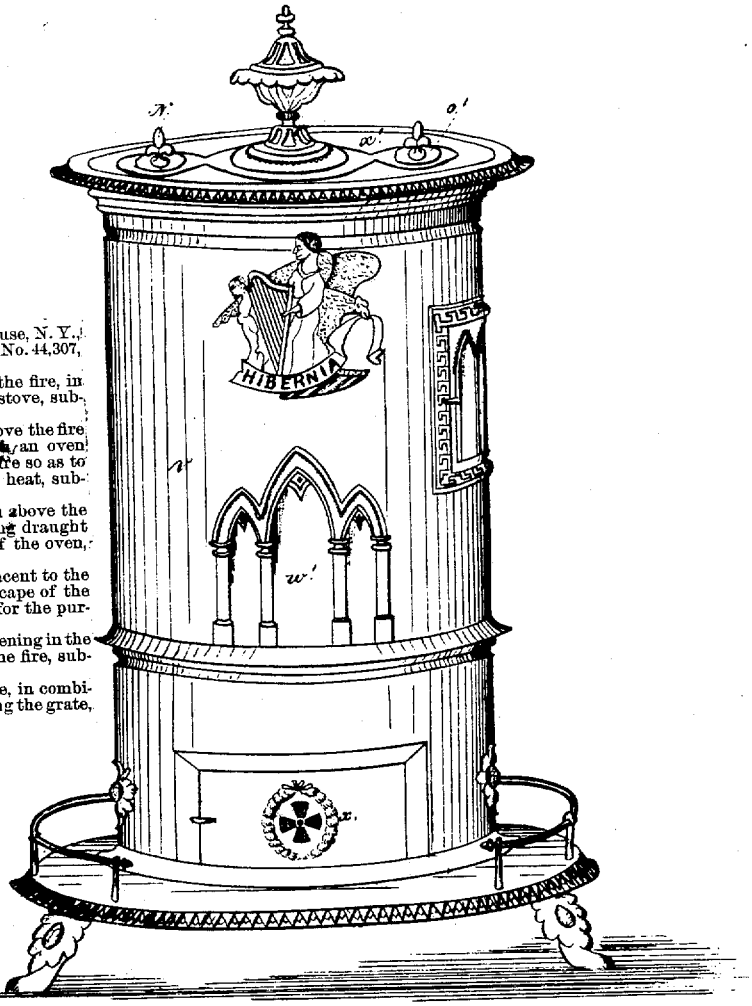

705.—*Base-Burning Stove.*—JOHN R. HAWKINS, Syracuse, N. Y., assignor to BACKUS, BUTTON AND COMPANY.—Patent No. 44,307, dated September 20, 1864.

*Claim.*—1. An oven placed over and adjacent to the fire, in combination with the fuel-reservoir of a base-burning stove, substantially as set forth.

2. A reservoir or hopper for fuel extending from above the fire, the upper portion of the stove, in combination with an oven located within the casing of the stove and above the fire so as to be exposed on the bottom thereof to the direct rays of heat, substantially as set forth.

3. A stove having a magazine for fuel and an oven above the fire and within the casing of the stove, and a descending draught to the base of the stove and with flues at the sides of the oven, substantially as specified.

4. A base-burning stove with an oven over and adjacent to the fire, a fuel-reservoir, and a damper to regulate the escape of the products of combustion upwardly, substantially as and for the purposes set forth.

5. The oven over and adjacent to the fire with an opening in the bottom, in combination with a fuel-magazine above the fire, substantially as set forth.

6. The pyramidal grate with teeth around its base, in combination with stationary teeth upon the metal surrounding the grate, substantially as set forth.

John R. Hawkins

Witnesses

Chas. H. Smith

Geo. D. Walker

Samuel W. Ferrell atty.

AM. PHOTO-LITHOGRAPHIC CO. N.Y. (OSBORNE'S PROCESS.)

EXAMINER.

(154.) 2 Sheets--Sheet 2.

J. R. HAWKINS.

Base Burning Stove.

No. 4,705. Reissued Jan. 9, 1872.

John R. Hawkins,

Lemuel W. Serrell atty.

Witness.

Chas. H. Smith

Geo. D. Hauser

AM. PHOTO-LITHOGRAPHIC CO. N.Y. (OSBORNE'S PROCESS.)

UNITED STATES PATENT OFFICE.

JOHN R. HAWKINS, OF SYRACUSE, NEW YORK, ASSIGNOR TO BACKUS, BUTTON AND COMPANY.

IMPROVEMENT IN BASE-BURNING STOVES.

Specification forming part of Letters Patent No. 44,307, dated September 20, 1864; reissue No. 4,705, dated January 9, 1872.

*To all whom it may concern:*

Be it known that I, JOHN R. HAWKINS, of Syracuse, in the county of Onondaga and State of New York, have invented a new and improved Coal-Burning Stove; and I do hereby declare the following to be a correct description thereof.

This invention relates to a base-burning stove with a reservoir above the fire and an oven over the fire and exposed to its direct rays. The products of combustion pass away either upwardly around the oven or downwardly through the base of the stove, and the base is of a peculiar pyramidal form, with teeth to break up clinkers or slate. This stove is adapted to use as a parlor-stove for heating purposes, and its appearance is not injured by the oven, thereby greatly promoting the usefulness of the stove, especially with persons of limited means or facilities.

Figure 5:
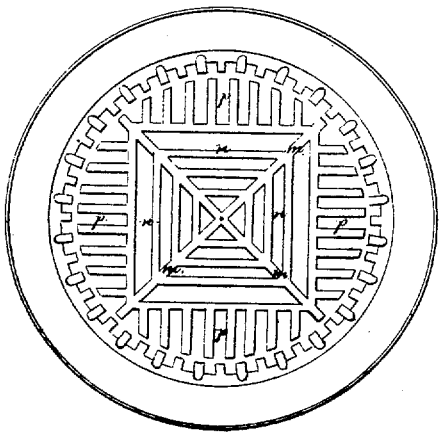
Figure 3:
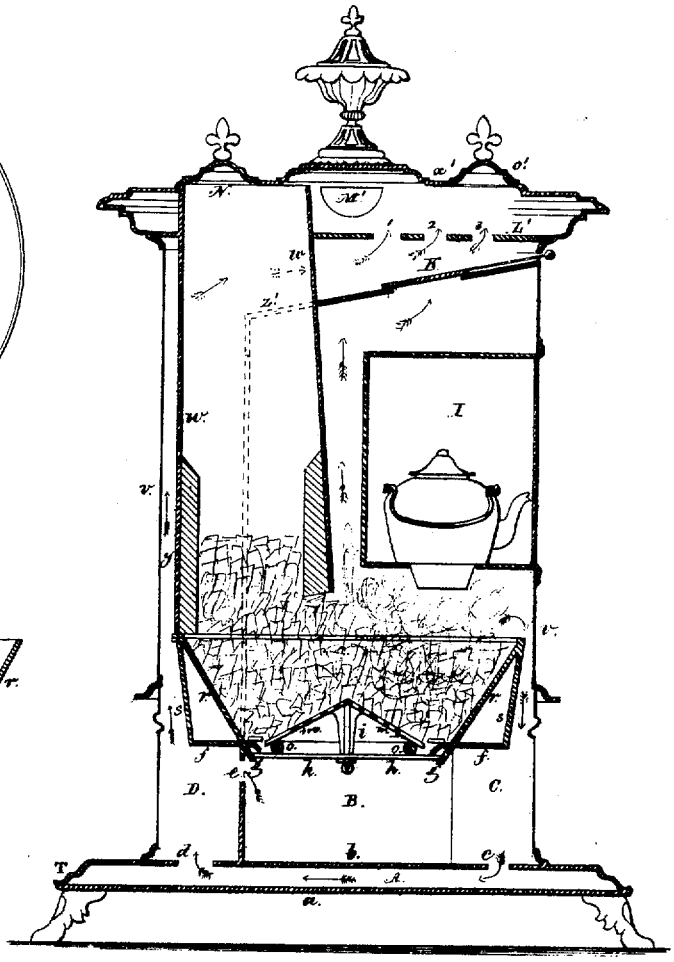
Figure 4:
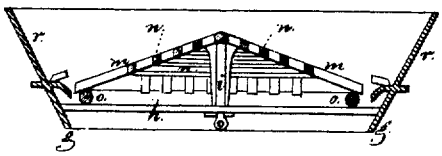
Figure 2:
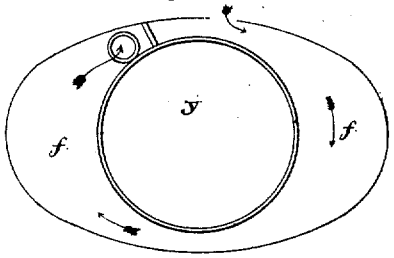

In the drawing, Figure 1 is a front view of the exterior of the stove. Fig. 2 is a top view of the bed-plate which supports the fire-pot and grate and forms a part of the grate. Fig. 3 is a vertical section of the stove. Fig. 4 is a vertical section of the grate, and Fig. 5 is a top-view of the grate and bed-plate combined.

The exterior casing of my stove is constructed in any of the known forms and is ornamented as desired. The case shown in Fig. 1 is elliptical. The interior is constructed as shown in Fig. 3, and is substantially the same, whatever may be the form of the outside casing. The base is made of two plates, *a* and *b*, the space between them forming the flue A. A portion, T, of the flange of the upper plate *b* is removable, so that the flue A can be cleaned out. The upper plate *b* of the base is formed with two openings, *c* and *d*, one leading from the chamber C into the flue A and the other leading from the flue A into the chamber D. These openings are of a size sufficient to conduct all the heat, flame, and smoke from the chamber C through the flue A into the chamber D in the direction shown by the arrows in Fig. 3. Upon the central portion of the upper plate *b* is the ash-pit B extending from the front to the back part of the stove and closed in front by a door, *x*, Fig. 1. In the sides of the ash-pit B are several openings, *e*, into the chamber D. These openings are closed up when necessary by means of a slide-register not shown in the drawing. Upon the top of the ash-pit B is the bed-plate *f* with an opening in its center large enough for the grate to work easily therein. This opening is shown at Y, Fig. 2. Upon the under surface of this bed-plate *f* are two lugs, *g g*, one upon each side of the grate-opening and within the ash-pit B. The lugs support the horizontal bar *h*, upon which the grate revolves. The grate is pyramidal in form, and is supported by a standard, *i*, extending from the apex down upon and through the horizontal bar *h* with a shoulder resting upon the upper side of the bar *h*. Upon the top of the horizontal bar *h* is cast a supporting-ring, *o*, for the grate, its diameter being slightly less than the grate. Upon this ring *o* the outer edge of the grate slides when it is shaken. The grate is made of inclined bars *m m* converging and forming a pyramid, these bars *m m* forming the angles or hips of the pyramid. Parallel bars *n n* connected to the bars *m*, and having spaces of proper size between them form the sides of the pyramidal grate. Upon the lower bar *n* at the base of the pyramid are teeth *p* of varying lengths so as to make the whole grate, when complete, circular in form. Around the inner edge of the circular opening Y in the bed-plate *f* are teeth, every alternate one of which is about the same thickness as the bed-plate, and the other half are about twice that thickness. When the grate is revolved the clinkers and slate are ground to pieces between the teeth upon the grate and those upon the edge of the opening in the bed-plate and readily fall through the openings between them. Above this bed-plate *f* and a little outside of the opening therein is the fire-pot *r*, which is circular at the bottom and may be elliptical at the top and two or three inches smaller than the outer shell of the stove. I make this fire-pot of suitable depth, and it may be surrounded with an iron jacket, *s s*. Air may be admitted to the exterior of the fire-pot. The coal-reservoir *w* extends from above the fire-pot to the upper part of the stove or nearly so, and a cover is provided at N to allow for the introduction of the fuel.

The lower end of this reservoir may be lined with soapstone or similar material. The coal passes freely from this reservoir into the fire, as required, and spreads upon the surface of that portion of the fire which is not beneath the reservoir. The exterior casing *v* of the stove may be more or less ornamental and of suitable size and shape. I have shown an ornamental frame and windows at *w'*, and a top-plate, *x'*, forms the upper part of the stove. This also may be ornamented. Within the casing there is a division at *z'*, near the upper part of such casing, and a damper, *k*. The flue-space above this casing is connected by a vertical flue, *y*, with the flue in the base of the stove. When the damper *k* is closed the products of combustion will descend into the base of the stove and thence pass by the flue *y* to the top portion of the stove and thence by the flue M' to the chimney. If the damper K is open the products of combustion will pass at this point directly to the flue M'. The plate L' may be introduced above the plate *z'* to cause a more equal distribution of heat as the products of combustion pass through the openings 1 2 3 therein, as indicated by the arrows, Fig. 3. The plate *z'* being inclined toward the flue *y* causes the dust to slide off the same, and the removable stopper T gives access for cleaning the flues. Above the fire and within the casing of the stove is the oven I. The same is provided with a suitable door, and I have represented a kettle within the oven, there being an opening in the bottom of said oven for the reception of such kettle or other cooking utensil, and this opening is to be closed by a cover when the oven is employed for baking purposes. This oven is exposed to the direct action of the fire heat on the bottom, and the products of combustion rise in the flue-spaces around or at the sides of such oven. When the damper K is open the products of combustion will pass around the oven, but when the damper is closed the oven will be principally heated by radiation from the fire and the plenum of heat within the casing.

The fire may be kindled upon the grate before coal is placed in the reservoir, but if the fire should go out it may be rekindled by clearing the coal and ashes from one side of the grate. When the grate is shaken the edges or hips of the pyramid raise the mass of ashes, slate, or clinkers, and the smaller portions fall through, and the clinkers and larger pieces of slate are broken by the action of the teeth around the edges of the grate and fire-pot or bed-plate. The removable cover at *o'* allows for plates or other articles to be placed on the opening so as to be warmed.

I am aware that many of the separate parts of this stove have before been employed, and also that a reservoir for coal has been used in a cooking-stove and that the products of combustion have passed away laterally to the flues around the oven. In my stove the oven is above and adjacent to the fire and exposed to its direct rays.

I claim as my invention—

1. An oven placed over and adjacent to the fire, in combination with the fuel-reservoir of a base-burning stove, substantially as set forth.

2. A reservoir or hopper for fuel extending from above the fire to the upper portion of the stove, in combination with an oven placed within the casing of the stove and above the fire so as to be exposed on the bottom thereof to the direct rays of heat, substantially as set forth.

3. A stove having a magazine for fuel and an oven above the fire and within the casing of the stove, and a descending draught into the base of the stove and with flues at the sides of the oven, substantially as specified.

4. A base-burning stove with an oven over and adjacent to the fire, a fuel-reservoir, and a damper to regulate the escape of the products of combustion upwardly, substantially as and for the purposes set forth.

5. The oven over and adjacent to the fire with an opening in the bottom, in combination with a fuel-magazine above the fire, substantially as set forth.

6. The pyramidal grate with teeth around its base, in combination with stationary teeth upon the metal surrounding the grate, substantially as set forth.

Signed by me this 24th day of November, A. D. 1871.

JOHN R. HAWKINS.

Witnesses:
SARAH M. HAWKINS,
J. A. NOTTINGHAM.

(154)